United States Patent [19]

Bartley et al.

[11] 4,447,197

[45] May 8, 1984

[54] TIRE MOLD WITH AIR VENT INSERTS

[75] Inventors: Donald R. Bartley, Cuyahoga Falls, Ohio; James M. Haase, Lansdale, Pa.

[73] Assignee: The B. F. Goodrich Company, Akron, Ohio

[21] Appl. No.: 517,092

[22] Filed: Jul. 25, 1983

[51] Int. Cl.³ .............................................. B29H 5/02
[52] U.S. Cl. .................................. 425/28 R; 425/812; 249/141
[58] Field of Search ...................... 425/203, 812, 28 R, 425/352; 249/141; 264/126, 320

[56] References Cited

U.S. PATENT DOCUMENTS

| | | | |
|---|---|---|---|
| 2,965,946 | 12/1960 | Sweet et al. | 425/352 X |
| 3,377,662 | 4/1968 | Fukushima | 425/812 |
| 3,804,566 | 4/1974 | Kimura | 425/812 |
| 3,822,857 | 7/1974 | Tanie | 425/812 |
| 3,891,363 | 6/1975 | Sievers et al. | 249/141 X |

Primary Examiner—J. Howard Flint, Jr.
Attorney, Agent, or Firm—H. F. Pepper, Jr.

[57] ABSTRACT

A tire mold having air venting passages or holes is provided with plastic inserts or plugs for the vent holes along the cavity side of the mold. The inserts are composed of a plastic material having a heat distortion temperature of no less than 275° F. at 66 psi in accordance with ASTM D648 and a coefficient of thermal expansion less than $8 \times 10^{-5}$ in/in/°C.

4 Claims, 2 Drawing Figures

TIRE MOLD WITH AIR VENT INSERTS

BACKGROUND OF THE INVENTION

The invention relates to tire molds, and in particular to tire molds with special inserts for air vent openings or holes passing through the molds.

Molds for rubber tires are usually provided with a plurality of strategically located small diameter passages from the cavity to the mold exterior to bleed or vent trapped air from the mold during use so that contact between the rubber tire being formed in the mold and the cavity wall is optimized. The vent holes are normally machined through the walls of the mold by drilling, or the like. In forming these holes, there is a minimum hole diameter attainable due to structural characteristics of the tire mold as well as limitations of the machining operations and equipment.

It is advantageous to provide as small a diameter vent hole as will still permit air venting but will reduce the amount of and opportunity for rubber to flow into the hole which ultimately forms as projections from the surface of the finished tire. These projections, depending on their size and thickness, must be removed from the finished tire and/or can remain in the vent hole by being torn from the tire surface upon removal of the tire from the mold thereby plugging or closing the vent hole for subsequent operation.

To reduce the hole diameters beyond what is normally achievable by machining, cylindrical metal inserts or "plugs" with very small openings or bores therethrough have been fitted into the cavity side portions of the machined vent holes, thus providing the desired small openings (see U.S. Pat. No. 3,377,662). It has been further found that to provide such inserts made from a low friction material, such as plastic, is even more advantageous, in reducing the possibility of rubber projections remaining in the insert by tearing from the tire upon removal. Because these low friction plastic inserts offer less resistance or are non-adherent to rubber, the projections more often slide clear from the insert bore rather than tear (see U.S. Pat. No. 3,377,662 and 3,804,566).

Using these plastic inserts, however, have caused certain problems different from those minimized by use of such inserts. Such plastic inserts have been found to "creep" or "swell" while in use causing closure of the vent hole and/or causing the plugs to project into the cavity leaving a marred or blemished appearance on the surface of the finished article.

SUMMARY

The instant invention solves the problems heretofore resulting in use of molds with low friction plastic vent plugs or inserts by providing a mold with plastic inserts which are not prone to creep or swell during mold use. Such inserts or "plugs" according to the invention are composed of a plastic material with specific thermal expansion and heat distortion properties which prevent its creep or swelling during repeated use in a tire mold.

THE DRAWINGS

In the drawings:

FIG. 1 shows a portion of a tire mold in section with vent holes utilizing plastic inserts; and FIG. 2 is an enlarged view of a portion of FIG. 1 showing a single vent hole provided with a plastic insert.

DETAILED DESCRIPTION

Figure 1:
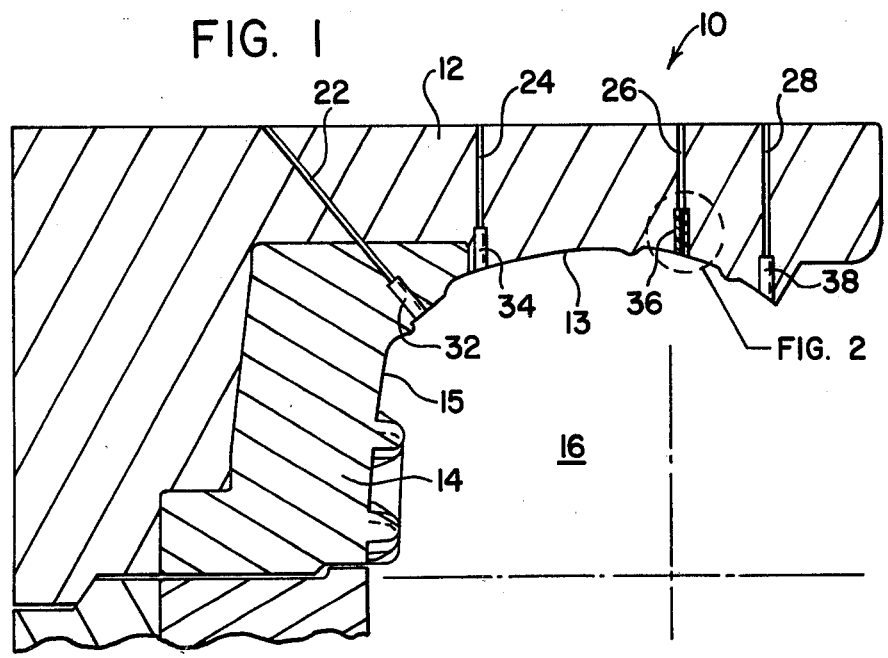

In FIG. 1, a portion of a tire mold 10 is shown which includes a principal mold shell or housing portion 12 into which is secured a replaceable portion of a tread segment or "ring". The mold housing portion 12 has an internal surface portion 13 and tread ring portion 14 has an internal surface portion 15 which cooperate to define a portion of a mold cavity 16.

A tire (not shown) is cured and formed in a mold such as 10 by being pressurized against surface portions 13 and 15 with application of heat.

To bleed or vent trapped air from the mold 10, a plurality of passages or vent holes 22, 24, 26 and 28 are provided through the walls of the mold. Adjacent the cavity side of the mold along the surfaces 13 and 15 of housing portion 12 and tread ring portion 14, respectively, inserts or plugs 32, 34, 36 and 38 are fitted in portions of vent holes 22, 24, 26 and 28.

Figure 2:
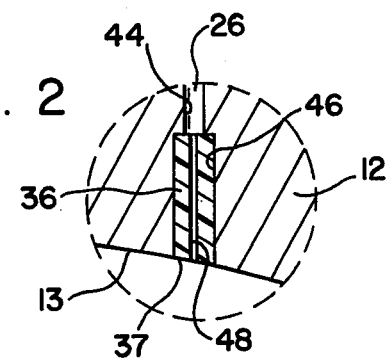

Referring to FIG. 2, vent hole 26 is shown to have a larger diameter bore 46 adjacent cavity surface 13 of housing 12 which reduces to a smaller diameter bore 44. The larger diameter bore 46 is dimensioned to receive a cylindrical insert or vent plug 36. Opening or bore 48 through insert 36 is of significantly smaller diameter than the machined small diameter bore 44 of vent hole 26.

As shown in the drawings the forward faces of the inserts, such as 37 of insert 36, are made flush with the cavity surfaces 13 and 15 to prevent a blemished appearance of a tire cured in mold 10.

In accordance with the invention each insert 32, 34, 36 and 38 used respectively in the vent holes 22, 24, 26 and 28 are made of plastic material having low coefficient of friction. Also, the particular low friction plastic selected to constitute each insert is of a type having a low propensity to creep or swell when subjected to the pressures and temperatures normally encountered in tire molds.

It has been found that low friction plastic material with coefficients of thermal expansion less than $8 \times 10^{-5}$ in/in/°C. and with heat distortion temperatures at or above 275° F. at 66 psi in accordance with ASTM D648 are best suited for use as inserts according to the present invention. Representative plastic families having materials exhibiting these suitable properties are polysulfones; polyphenylene sulfides; copolymers or polymers of amides and imides; polyarylsulfones; polyethersulfones; polyarylates; and aromatic copolyesters. Preferred from the above families of plastics are those selected from the polyethersulfones or polyphenylene sulfides.

It is understood that the foregoing detailed description is for purposes of illustration of the invention in accordance with presently preferred embodiments and that departures from such description are possible within the scope of the present invention which is to be fairly measured by the following claims.

We claim:

1. A tire mold having a mold cavity and at least one vent hole of selected diameter extending from said cavity to the exterior of said mold, a cylindrical insert disposed within said vent hole and having an opening therethrough of diameter less than the said selected vent hole diameter, said insert being of a low friction plastic material having a coefficient of thermal expansion less than $8\times10^{-5}$ in/in/°C. and a heat distortion temperature at 66 psi when measured in accordance with ASTM D648 of no less than 275° F.

2. The tire mold as defined in claim 1 wherein said plastic material is selected from groups consisting of polysulfones, polyphenylene sulfides, copolymers or polymers of amides and imides, polyarylsulfones, polyarylates, and aromatic copolyesters.

3. The tire mold as defined in claim 1 wherein said plastic material is polyphenylene sulfide.

4. The tire mold as defined in claim 1 wherein said plastic material is polyethersulfone.

* * * * *